(12) United States Patent
Zhang

(10) Patent No.: US 7,250,965 B2
(45) Date of Patent: *Jul. 31, 2007

(54) SYSTEM AND METHOD FOR CALIBRATING A CAMERA WITH ONE-DIMENSIONAL OBJECTS

(75) Inventor: Zhengyou Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/275,457

(22) Filed: Jan. 5, 2006

(65) Prior Publication Data

US 2006/0132869 A1 Jun. 22, 2006

Related U.S. Application Data

(63) Continuation of application No. 10/162,859, filed on Jun. 3, 2002, now Pat. No. 7,068,303.

(51) Int. Cl.
*H04N 17/00* (2006.01)
(52) U.S. Cl. ..................................... 348/187
(58) Field of Classification Search ........ 348/187–189, 348/180, 184
See application file for complete search history.

(56) References Cited

U.S. PATENT DOCUMENTS

| | | | |
|---|---|---|---|
| 5,444,481 A | 8/1995 | Oshima et al. | |
| 5,579,444 A * | 11/1996 | Dalziel et al. | 700/259 |
| 5,699,440 A | 12/1997 | Carmeli | |
| 5,745,126 A * | 4/1998 | Jain et al. | 382/154 |
| 5,821,993 A * | 10/1998 | Robinson | 348/187 |
| 6,016,161 A * | 1/2000 | Robinson | 348/187 |
| 6,147,702 A * | 11/2000 | Smith | 348/41 |
| 6,288,385 B1 * | 9/2001 | Miramonti et al. | 250/208.1 |
| 6,377,298 B1 * | 4/2002 | Scheele et al. | 348/187 |
| 6,437,823 B1 | 8/2002 | Zhang | |
| 6,444,481 B1 * | 9/2002 | Pasadyn et al. | 438/5 |

FOREIGN PATENT DOCUMENTS

| | | |
|---|---|---|
| CA | 2332094 | 7/2002 |
| DE | 195 36 297 | 4/1997 |

OTHER PUBLICATIONS

Liebowitz, et al., "Metric Rectification for Perspective Images of Planes", Proceedings of the IEEE Conference on Computer Vision and Pattern Recognition, Santa Barbara, California, Jun. 1998, pp. 482-488.

Luong, et al., "Self-Calibration of a Moving Camera from Point Correspondences and Fundamental Matrices", The International Journal of Computer Vision, 22(3), 1997, pp. 261-289.

Maybank, et al., "A Theory of Self-Calibration of a Moving Camera", The International Journal of Computer Vision, 8(2), Aug. 1992, pp. 123-153.

(Continued)

*Primary Examiner*—Paulos Natnael

(57) ABSTRACT

Calibration for a camera is achieved by receiving images of a calibration object whose geometry is one-dimension in space. The received images show the calibration object in several distinct positions. Calibration for the camera is then calculated based on the received images of the calibration object.

10 Claims, 6 Drawing Sheets

OTHER PUBLICATIONS

J.J. More, "The Levenberg-Marquardt Algorithm: Implementation and Theory", G.A. Watson, editor, Numberical Analysis, Lecture Notes in Mathematics 630, 1997, Springer-Verlag, pp. 105-116.

G. Stein, "Accurate Internal Camera Calibration Using Rotation, with Analysis of Sources of Error", Proc. Fifth International Conference on Computer Vision, Cambridge, Massachusetts, Jun. 1995, pp. 230-236.

Sturm, et al., "On Plane-Based Camera Calibration: A General Algorithm, Singularities, Applications", Proceedings of the IEEE Conference on Computer Vision and Pattern Recognition, Fort Collins, Colorado, Jun. 1999, pp. 432-437.

B. Triggs, "Autocalibration from Planar Scenes", Proceedings of the 5th European Conference on Computer Vision, Freiburg, Germany, Jun. 1998, pp. 89-105.

Roger Y Tsai, "A Versatile Camera Calibration Technique For High-Accuracy 3D Machine Vision Metrology Using Off-The-Shelf TV Cameras and Lenses", IEEE Journal of Robotics and Automation, vol. 3, No. 4, Aug. 1987, pp. 323-344.

G.Q. Wei, et al, "A Complete Two-Plane Camera Calibration Method and Experimental Comparisons", Proc 4th International Conference on Computer Vision, Berlin, May 1993, pp. 439-446.

J. Weng, et al, "Camera Calibration with Distortion Models and Accuracy Evaluation", IEEE Transactions on Pattern Analysis and Machine Intelligence, 14(10), Oct. 1992, pp. 965-980.

Z. Zheng, "A Flexible New Technique for Camera Calibration", IEEE Transactions on Pattern Analysis and Machine Intelligence, 22(11), Nov. 2000, pp. 1330-1334.

Duane C. Brown, "Close-range Camera Calibration", Photogrammetric Engineering, 37(8), 1971, pp. 855-866.

Caprile, et al., "Using Vanishing Points for Camera Calibration", The International Journal of Computer Vision, 4(2), Mar. 1990, pp. 127-139.

W. Faig, "Calibration of Close-Range Photogrammetry Systems: Mathematical Formulation", Photogrammetric Engineering and Remote Sensing, 41(12), 1975, pp. 1479-1486.

Faugeras, et al., "Camera Self-Calibration: Theory and Experiments", Proc 2nd ECCV, vol. 588 of Lecture Notes in Computer Science, Santa Margherita Ligure, Italy, Springer-Verlag, May 1992, pp. 321-334.

Faugeras, et al. "The Calibration Problem for Stereo", Proceedings of the IEEE Conference on Computer Vision and Pattern Recognition, Miami Beach, FL, Jun. 1986, pp. 15-20.

Olivier Faugeras, "Three-Dimensional Computer Vision: a Geometric Viewpoint", MIT Press, 1993, 663 pages.

S. Ganapathy, "Decomposition of Transformation Matrices for Robot Vision", Pattern Recognition Letters, Dec. 2, 1984, pp. 401-412.

D. Gennery, "Stereo-Camera Calibration", Proceedings of the 10th Image Understanding Workshop, 1979, pp. 101-107.

Richard Hartley, "An Algorithm for Self Calibration from Several Views", Proceedings of the IEEE Conference on Computer Vision and Pattern Recognition, Seattle, WA, Jun. 1994, pp. 908-912.

Richard Hartley, "Self-Calibration from Multiple Views with a Rotating Camera", J. Eklundh, editor, Proceedings of the 3rd European Conference on Computer Vision, vol. 800 of Lecture Notes in Computer Science, Stockholm, Sweden, Springer-Verlag, May 1994, pp. 471-478.

* cited by examiner

| Solution | $\alpha$ | $\beta$ | $\gamma$ | $u_0$ | $v_0$ |
|---|---|---|---|---|---|
| Closed-form | 889.49 | 818.59 | -0.1651 (90.01°) | 297.47 | 234.33 |
| Nonlinear | 838.49 | 799.36 | 4.1921 (89.72°) | 286.74 | 219.89 |
| Plane-based | 828.92 | 813.33 | -0.0903 (90.01°) | 305.23 | 235.17 |
| Relative difference | 1.15% | 1.69% | 0.52% (0.29°) | 2.23% | 1.84% |

Fig. 7

SYSTEM AND METHOD FOR CALIBRATING A CAMERA WITH ONE-DIMENSIONAL OBJECTS

RELATED APPLICATIONS

The present application claims priority under 35 U.S.C. §120 as a continuation of U.S. patent application Ser. No. 10/162,859, filed Jun. 3, 2002 now U.S. Pat. No. 7,068,304, the entire disclosure of which is hereby incorporated by reference in its entirety.

TECHNICAL FIELD

This invention relates to computer vision and photogrammetry, and more particularly, camera calibration.

BACKGROUND

Camera calibration is a necessary step in three-dimensional (3D) computer vision in order to extract metric information from two-dimensional (2D) images. Much work has been done, starting in the photogrammetry community [1, 3], and more recently in computer vision [8, 7, 19, 6, 21, 20, 14, 5]. According to the dimension of the calibration objects, the aforementioned works can be classified into roughly three categories: (i) 3D reference object based calibration; (ii) 2D plane based calibration; and (iii) self-calibration.

Three-dimensional reference object based camera calibration is performed by observing a calibration object whose geometry in 3-D space is known with precision. The calibration object usually consists of two or three planes orthogonal to each other. Sometimes, a plane undergoing a precisely know translation is also used [19], which equivalently provides 3D reference points. These approaches require an expensive calibration apparatus, and an elaborate setup.

Two-dimensional plane based camera calibration, requires observations of a planar pattern shown in different orientations [22, 17]. This technique, however, does not lend itself to stereoscopic (or multiple) camera set-ups. For instance, if one camera is mounted in the front of a room and another in the back of a room, it extremely difficult, if not impossible, to simultaneously observe a number of different calibration objects, to calibrate the relative geometry between the multiple cameras. Of course, this could be performed if the calibration objects were made transparent, but then the equipment costs would be incrementally higher.

Self-calibration techniques do not use any calibration object. By moving a camera in a static scene, the rigidity of the scene provides in general two constraints [14, 13] on the cameras' internal parameters from one camera displacement by using image information alone. If images are taken by the same camera with fixed internal parameters, correspondences between three images are sufficient to recover both the internal and external parameters which allow us to reconstruct 3-D structure up to a similarity [10,12]. Although no calibration objects are necessary, a large number of parameters are estimated, resulting in very expensive computer-implemented computations and a larger percentage of calibration errors.

It is noted that in the preceding paragraphs, as well as the remainder of this specification, the description refers to various individual publications identified by numeric designator contained within a pair of brackets. For example, such a reference may be identified by reciting "reference [1]" or simply "[1]". Multiple references will be identified by a pair of brackets containing more than one designator, for example, [2, 4]. A listing of the publications corresponding to each designator can be found at the end of the Detailed Description section.

SUMMARY

A system and method for calibrating a camera is described. In one implementation, calibration for a camera is achieved by receiving images of a calibration object whose geometry is one-dimension in space. The received images show the calibration object in several distinct positions. Calibration for a camera is then calculated based on the received images of the calibration object.

The following implementations, therefore, introduce the broad concept of solving camera calibration by using a calibration object whose geometry is one-dimension in space.

BRIEF DESCRIPTION OF THE DRAWINGS

The detailed description is described with reference to the accompanying figures. In the figures, the left-most digit(s) of a reference number identifies the figure in which the reference number first appears.

FIG. 7 is table showing data with respect to a camera calibration experiment involving a camera calibration system implemented in accordance with the exemplary descriptions herein.

DETAILED DESCRIPTION

The following discussion is directed to camera calibration using one-dimensional objects. The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Calibration System

Figure 1:
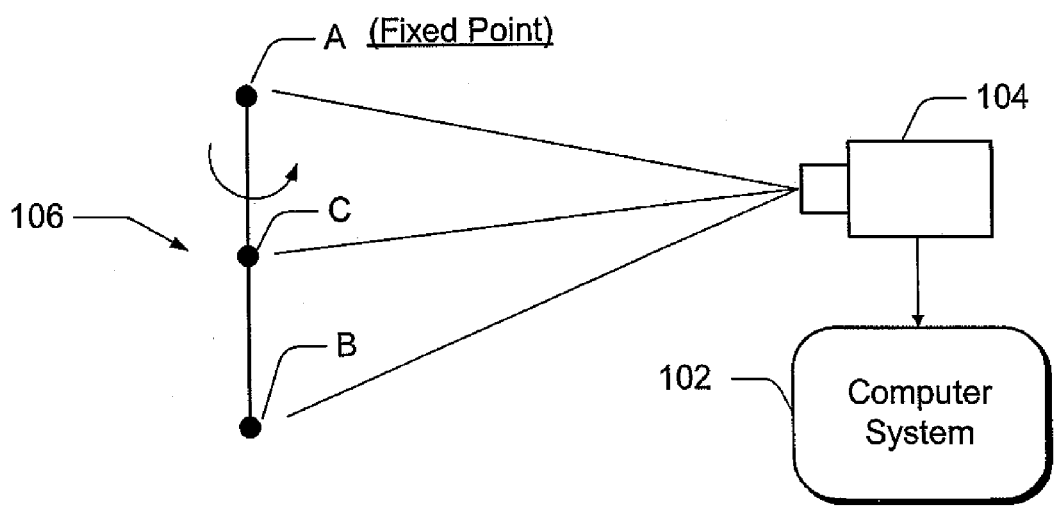
FIG. 1 illustrates an exemplary diagram of a camera calibration system.

FIG. 1 illustrates an exemplary diagram of a camera calibration system 100. Calibration system 100 includes a computer system 102, a camera 104 and a calibration object 106. The computer system 102 is described in more detail with reference to FIG. 9 and performs camera calibration calculations. Based on the camera calibration calculations, the computer system 102 can send signals (not shown) to the camera 104; the signals representing values that can be used to calibrate the camera 104. The computer system 102 could also be distributed within a computing system having more than one computing device. See the description of "Exemplary Computing System and Environment" below for specific examples and implementations of networks, computing systems, computing devices, and components that can be used to implement the calibration processes described herein.

The camera 104 may be any type of object imaging device such as a digital camera and/or analog camera. As shall become more apparent, more than one camera can be used in camera calibration system 100. For instance, suppose that camera 104 is mounted at the front of a room and another camera (not shown) is mounted at the back of the room. Both cameras can then be calibrated by simultaneously imaging the same calibration object 106. This is very difficult, if not impossible, to achieve with 3D or 2D calibration systems when two or more cameras are mounted at opposite ends of a room. This scenario, however, does not present a problem for calibration system 100, because of the ability to calibrate the camera(s) 104 using calibration object 106 that is one-dimensional and is visible from virtually any point in the space. Camera 104 sends images of the calibration object to computer system 102 though any type of connector, such as, for example through a 1394 link.

The calibration object 106 is a one-dimensional (1D) object. In the exemplary illustration, calibration object 106 consists of three collinear points A, B, and C. The collinear points A, B, and C should be measured to provide known relative positions between the points. Moreover, one of the points, as shall be explained in more detail, should remain fixed (i.e., stationary). The points A, B, and C can be implemented with any inexpensive objects such as a string of beads or balls hanging from a ceiling, or a stick with Styrofoam spheres, etc. The calibration object 106 could also consist of four or more points (not shown), however, camera calibration is not recommended if less than three points are used due to having too many unknown parameters, making the calibration impossible. The fixed point does not need to be visible to the camera because it can be computed by intersecting image lines.

Figure 2:
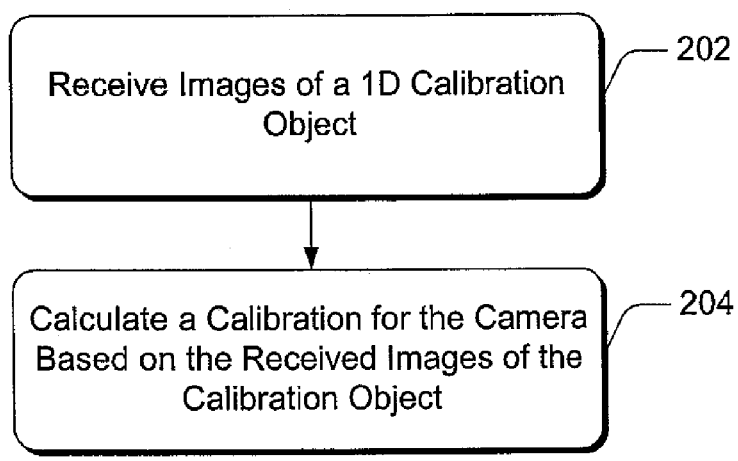
FIG. 2 is a flow chart illustrating a process for calibrating a camera.

FIG. 2 is a flow chart illustrating a process 200 for calibrating a camera 104 in system 100. Process 200 includes various operations illustrated as blocks. The order in which the process is described is not intended to be construed as a limitation. Furthermore, the process can be implemented in any suitable hardware, software, firmware, or combination thereof. In the exemplary implementation, the majority of operations are performed in software (such as in the form of modules or programs) running on computer system 102.

At block 202, images of the calibration object 106 are received by the computer system 102 from camera 104. Based on the received images, the computer system 102 is able to provide a calibration solution that can be used to calibrate camera 104 accordingly (block 204).

Notation & Setups With 1D Calibration Movement

Figure 3:
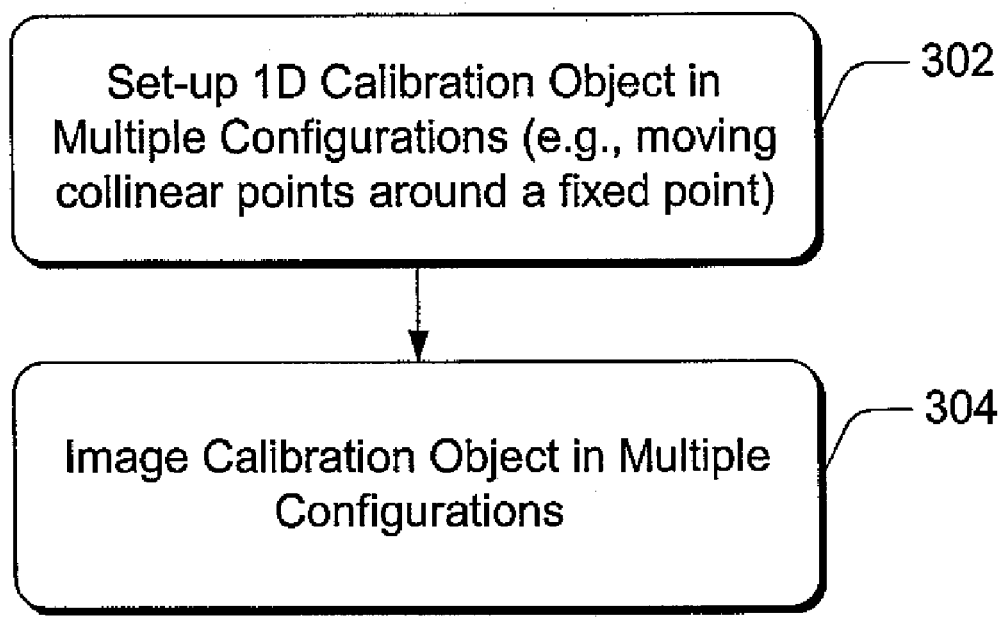
FIG. 3 is a flow chart illustrating an operation step in FIG. 2 in more detail.
Figure 4:
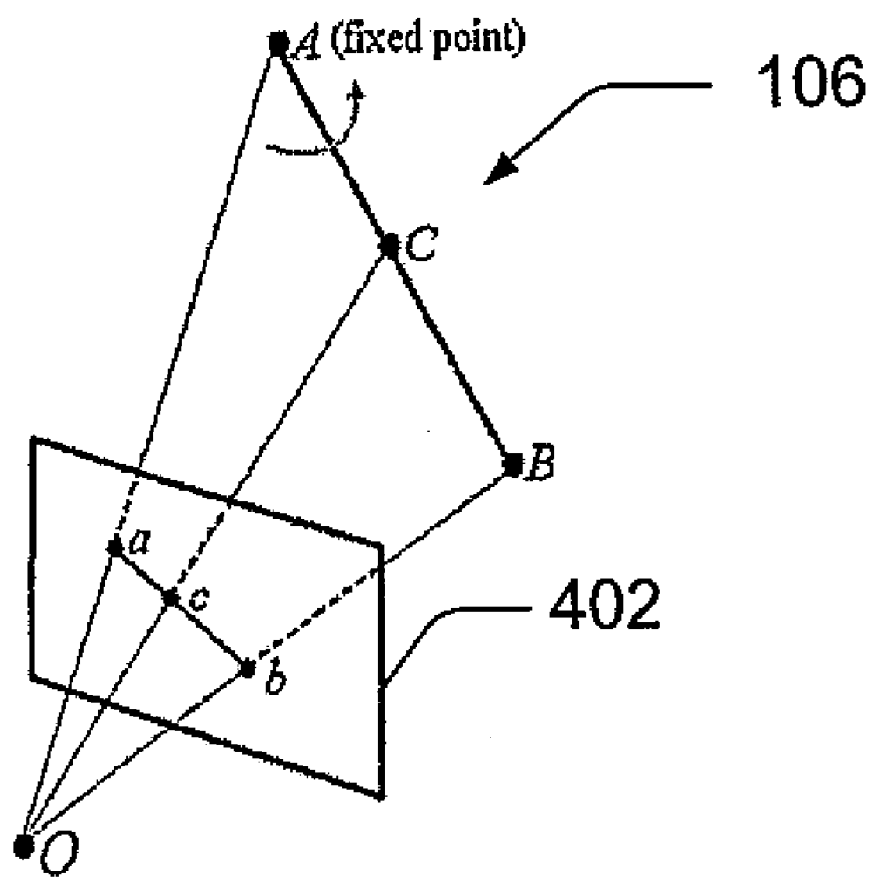
FIG. 4 shows another view of a calibration object as points C and B move around point A, which remains fixed.

FIG. 3 is a flow chart illustrating the received images operation in more detail. At blocks 302 and 304, calibration object 106 is moved around into different configurations while camera 104 images the calibration object 106. During the movement of the calibration object 106, at least one of the points remains fixed. For example, FIG. 4 shows another view of calibration object 106 as points C and B move around point A, which remains fixed. Images of the calibration object 106 are then sent to computer system 102.

To understand block 202 in more detail, reference is made to the notation used herein. A 2D point is denoted by m=[u, v]$_T$. A 3D point is denoted by M=[X, Y, Z]$^T$. The term $\tilde{x}$ is used to denote the augmented vector by adding 1 as the last element: $\tilde{m}$=[u, v, 1]$^T$ and $\tilde{M}$=[X, Z, 1]$^T$. A camera is modeled by the usual pinhole: the relationship between a 3D point M and its image projection m is given by $$s\tilde{m}=A[R\ t]\tilde{M}, \quad\quad\quad (1)$$

where s is an arbitrary scale factor and (R, t), which is called the extrinsic parameters, is the rotation and translation which relates the world coordinate system to the camera coordinate system. Without loss of generality, in one implementation, the camera coordinate system is used to define the calibration object 106, therefore, R=I and t=0 in equation 1 above. Additionally, matrix A, called the camera intrinsic matrix, is given by $$A = \begin{bmatrix} \alpha & \gamma & u_0 \\ 0 & \beta & v_0 \\ 0 & 0 & 1 \end{bmatrix} \quad\quad\quad (2)$$

with ($u_0$, $v_0$) the coordinates of the principle point, $\alpha$ and $\beta$ the scale factors in image u and v axes, and $\gamma$ the parameter describing the skewness of the two image axes. The task of camera calibration is to determine these five intrinsic parameters.

Finally, the abbreviation $A^{-T}$ will be used for $(A^{-1})^T$ or $(A^T)^{-1}$.

As mentioned above calibration is not recommended with free moving 1D objects. However, if one of the points remains fixed as shown in FIG. 4, for instance point A is the fixed point, and a is the corresponding image point, then camera calibration can be realized. We need three parameters, which are unknown, to specify the coordinates of A in the camera coordinate system, while image point a provides two scalar equations according to equation 1.

Solving Camera Calibration

By having at least three collinear points (see FIGS. 1 and 4) comprising the calibration object 106, the number of unknowns for the point positions is 8+2N, where N is the number of observations of the calibration object 106. This is because given N observations of the calibration object, we have 5 camera intrinsic parameters, 3 parameters for the fixed point A, and 2N parameters for the N positions of the free point B. For the latter, more explanation is provided here: for each observation, we only need 2 parameters to define B because of known distance between A and B; no additional parameters are necessary to define C once A and B are defined. For each observation, b provides two equations, but c only provides one additional equation, because of collinearity of a, b, c. Thus, the total number of equations is 2+3N for N observations. By counting the numbers, if there are six or more observations, then it should be possible to solve camera calibration, to be described in more detail with reference to step 204.

If more than three collinear points are used with know distances, the number of unknowns and the number of impendent equations remains the same, because of cross-ratios. Nevertheless, the more collinear points used, the more accurate camera calibration will be, because data redundancy tends to combat noise in the image data.

After a number of observations of the calibration object have been received by computer system 102 (i.e., block 202 in FIG. 2 and blocks 302, 304 in FIG. 3), it is possible to solve for camera calibration using a 1D calibration object (block 204 in FIG. 2). Block 204 describes a process for calculating camera calibration, which will be described in more detail. There are two implementations for solving the calibration problem: one involves a closed-form solution and the other involves a non-linear optimization (that is optional, but recommended for greater accuracy). In this section, both implementations will be described in more detail with reference to the minimal configuration implementation of the calibration object (three collinear points moving around a fixed point, e.g. A).

Referring to FIG. 4, point A is the fixed point in space, and the calibration object AB moves around A. The length of the calibration object measured from A to B is known to be L, i.e., $$\|B-A\|=L \quad (3)$$

The position of point C is know with respect to A and B, and therefore, $$C=\lambda_A A+\lambda_B B \quad (4)$$

where $\lambda_A$ and $\lambda_B$ are known. If C is the midpoint of AB, then $\lambda_A$ and $\lambda_B=0.5$. Points a,b, and c on the image plane 502 are a projection of space points A, B and C, respectively.

Again, without loss of generality, using the camera calibration system to define 1D objects, with R=I and t=0 in equation 1. Let the unknown depths for A, B and C be $z_A$, $z_B$ and $z_C$, respectively. According to equation 1, there are $$A=z_A A^{-1}\tilde{a} \quad (5)$$

$$B=z_B A^{-1}\tilde{b} \quad (6)$$

$$C=z_C A^{-1}\tilde{c} \quad (7)$$

Substituting them into (4) yields:

$$z_C \tilde{c}=z_A \lambda_A \tilde{a}+z_B \lambda_B \tilde{b} \quad (8)$$

after eliminating $A^{-1}$ from both sides. By performing a cross-product on both sides of the equation 8 with $\tilde{c}$, the following equation is realized:

$$z_A \lambda_A (\tilde{a} \times \tilde{c})+z_B \lambda_B (\tilde{b} \times \tilde{c})=0$$

Yielding:

$$z_B = -z_A \frac{\lambda_A (\tilde{a} \times \tilde{c}) \cdot (\tilde{b} \times \tilde{c})}{\lambda_B (\tilde{b} \times \tilde{c}) \cdot (\tilde{b} \times \tilde{c})} \quad (9)$$

From equation (3) we have $$\|A^{-1}(z_B \tilde{b}-z_A \tilde{a})\|=L$$

Substituting $z_B$ by (9) gives:

$$z_A \left\| A^{-1} \left( \tilde{a} + \frac{\lambda_A (\tilde{a} \times \tilde{c}) \cdot (\tilde{b} \times \tilde{c})}{\lambda_B (\tilde{b} \times \tilde{c}) \cdot (\tilde{b} \times \tilde{c})} \tilde{b} \right) \right\| = L$$

This is equivalent to $$z_A^2 h^{-T} A^{-1} h = L^2 \quad (10)$$

with $$h = \tilde{a} + \frac{\lambda_A (\tilde{a} \times \tilde{c}) \cdot (\tilde{b} \times \tilde{c})}{\lambda_B (\tilde{b} \times \tilde{c}) \cdot (\tilde{b} \times \tilde{c})} \tilde{b} \quad (11)$$

Equation 10 contains the unknown intrinsic parameters A and the unknown depth, $z_A$ of the fixed point A. It is the basic constraint for camera calibration with 1D objects. Vector h, give by equation 11, can be computed from image point and known $\lambda_A$ and $\lambda_B$. Since the total number of unknowns is six, it is recommended that at least six imaging observations of the calibration object 106 be made (that is, six different configurations of the calibration object). Note that $A^{-T}A$ actually describes the image of the absolute conic [12].

Closed-Form Solution

Let Equation (12) be:

$$B = A^{-T} A^{-1} \equiv \begin{bmatrix} B_{11} & B_{12} & B_{13} \\ B_{12} & B_{22} & B_{23} \\ B_{13} & B_{23} & B_{33} \end{bmatrix} =$$

$$\begin{bmatrix} \frac{1}{\alpha^2} & -\frac{\gamma}{\alpha^2 \beta} & \frac{v_0 \gamma - u_0 \beta}{\alpha^2 \beta} \\ -\frac{\gamma}{\alpha^2 \beta} & \frac{\gamma^2}{\alpha^2 \beta^2} + \frac{1}{\beta^2} & -\frac{\gamma(v_0 \gamma - u_0 \beta)}{\alpha^2 \beta^2} - \frac{v_0}{\beta^2} \\ \frac{v_0 \gamma - u_0 \beta}{\alpha^2 \beta} & -\frac{\gamma(v_0 \gamma - u_0 \beta)}{\alpha^2 \beta^2} - \frac{v_0}{\beta^2} & \frac{(v_0 \gamma - u_0 \beta)^2}{\alpha^2 \beta^2} + \frac{v_0^2}{\beta^2} + 1 \end{bmatrix}.$$

Note that B is symmetric, defined by a 6D vector $$b=[B_{11},B_{12}, B_{22}, B_{13}, B_{23}, B_{33}]^T. \quad (13)$$

Let $h=[h_1,h_2,h_3]^T$, and $x=z_a^2 b$, then equation (10) becomes $$v^T x = L^2 \quad (14)$$

with $$v=[h_1^2, 2h_1 h_2, h_2^2, 2h_1 h_3, 2h_2 h_3, h_3^2]^T.$$

When N images of the 1D object are observed, by stacking n such equations as (14) we have $$Vx=L^2 1 \quad (15)$$

Where $V=[v_1, v_N]^T$ and $1=[1, 1]^T$. The least-squares solution is then given by $$x=L^2(V^T V)^{-1} V^T 1 \quad (16)$$

Once x is estimated, computer system 102 can compute all the unknowns based on $x=z_a^2 b$. Let $x=[x_1, x_2, x_6]^T$. Without difficulty, it is possible to uniquely extract the intrinsic parameters for the camera and the depth $z_A$ as:

$$v_0 = (x_2 x_4 - x_1 x_5)/(x_1 x_3 - x_2^2)$$

$$z_A = \sqrt{x_6 - [x_4^2 + v_0(x_2 x_4 - x_1 x_5)]/x_1}$$

$$\alpha = \sqrt{z_A / x_1}$$

-continued $$\beta = \sqrt{z_A x_1 / (x_1 x_3 - x_2^2)}$$

$$\gamma = x_2 \alpha^2 \beta / s_A$$

$$u_0 = \gamma v_0 / \alpha - x_4 \alpha^2 / z_A$$

At this point, it is possible for the computer system 102 to compute $z_B$ according to equation (9), so points A and B can be computed from equations (5) and (6), while point C can be computed according to equations (3).

Nonlinear Optimization

In block 204, it is possible to refine the above calibration solutions through a maximum likelihood inference.

Supposing there are N images of the calibration object 106 and there are three points on the comprising the object. Point A is fixed, and points B and C move around A. Assume that the images points are corrupted by independent and identically distributed noise. The maximum likelihood estimate can be obtained by minimizing the following functional:

$$\sum_{i=1}^{N} (\|a_i - \phi(A, A)\|^2 + \|b_i - \phi(A, B_i)\|^2 + \|c_i - \phi(A, C_i)\|^2) \quad (17)$$

where $\phi(A,M)(M \in \{A,B_i,C_i\})$ is the projection of point M onto the image, according to equations (5) to (6). More precisely, $$\phi(A, M) = \frac{1}{z_M} AM,$$

where $z_M$ is the z-component of M.

The unknowns to be estimated are: five camera intrinsic parameters $\alpha,\beta,\gamma,u_0$ and $v_0$ that define matrix A; three parameters for the coordinates of the fixed point A; and two N additional parameters to defined points $B_i$ and $C_i$ at each instant. Therefore there are a total of 8+2N unknowns. Regarding the parameterization for B and C, we use the spherical coordinates $\phi$ and $\theta$ to define the direction of the calibration object 106, and point B is then given by:

$$B = A + L \begin{bmatrix} \sin\theta\cos\phi \\ \sin\theta\sin\phi \\ \cos\theta \end{bmatrix}$$

where L is the known distance between A and B. In turn, point C is computed according to equation (4). Therefore, only two additional parameters are needed for each observation.

Minimizing equation (17) is a nonlinear minimization problem, which is solved with the Levenberg-Marquardt Algorithm as implemented in Minpack [15]. This algorithm requires an initial guess of A, A, $\{B_i, C_i|i=1 . N\}$, which can be obtained using the closed-form solution described earlier.

Experimental Results

Using computer simulations suppose that a simulated camera 104 has the following properties: $\alpha=1000,\beta=1000$, $\gamma=0, u_0=320$ and $v_0=240$. The image resolution is 640×480. A calibration object 106 in the form of a stick is 70 cm long and is also simulated. The object has a fixed point A at [0, 35, 150]$^T$. The other endpoint of the object is B, and C is located at the half way point between A and B. One hundred random orientations of the calibration object 106 are generated by sampling $\theta$ in [$\pi/6,5\pi,6$] and $\phi$ in [$\pi,2\pi$] according to uniform distribution. Points A, B, and C are then projected onto the image 402.

Gaussian noise with 0 mean and $\sigma$ standard deviation is added to the projected image points a, b and c. The estimated camera parameters are compared with the ground truth, and their relative errors are measured with respect to focal length $\alpha$. Note that the relative errors in ($u_0, v_0$) with respect to $\alpha$, are as proposed by Triggs in [18]. Triggs pointed out that the absolute errors in ($u_0, v_0$) is not geometrically meaningful, while computing the relative error is equivalent to measuring the angle between the true optical axis and the estimated one.

Figure 5:
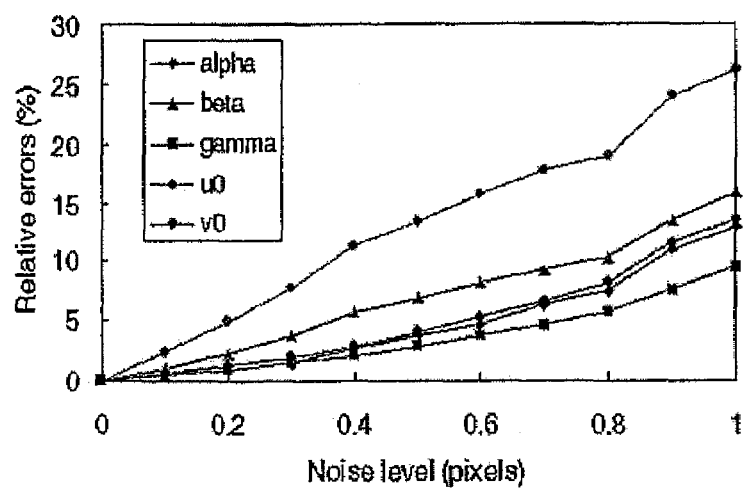
FIG. 5 is a graph illustrating relative errors for calibration results using a closed-form solution.
Figure 6:
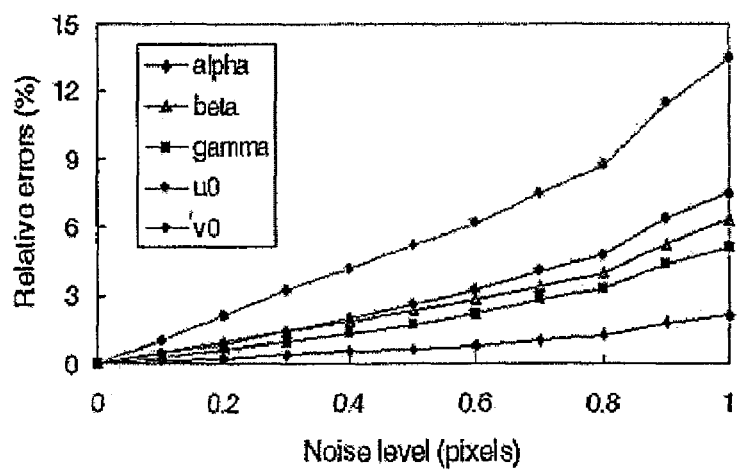
FIG. 6 is a graph illustrating the relative errors for calibration results using a nonlinear minimization result.

The noise level is varied from 0.1 pixels to 1 pixel. For each noise level, the calibration system 100 performs 120 independent trials, and the results as shown in FIGS. 5 and 6, are the average. FIG. 5 is a graph illustrating relative errors for calibration results using the closed-form solution. FIG. 6 is a graph illustrating the relative errors for calibration results using the nonlinear minimization result. Errors increase almost linearly with the noise level. The nonlinear minimization refines the closed-form solution, and produces significantly better results (with 50% less errors). At 1 pixel noise level, the errors for the closed-form solution are about 12% while those for the nonlinear minimization are about 6%.

Using actual real data, three toy beads were stung together with a stick to form the calibration object 106. The beads are approximately 14 cm apart (i.e., L =28). The stick was then moved around while fixing one end with the aid of a book. A video of 150 frames was recorded. A bead in the image is modeled as Gaussian blob in the RGB space, and the centroid of each detected blob is the image point we use for camera calibration. The proposed algorithm is therefore applied to the 150 observations of the beads, and the estimated parameters are provided in a table shown in FIG. 7. The first row is the estimation from the closed-form solution, while the second row is the refined result after nonlinear minimization. For the image skew parameter $\gamma$, the angle between the image axes are also provided in parenthesis (it should be close to 90 degrees).

For comparison, a plane-based calibration technique described in [22] was used to calibrate the same camera. Five images of a planar pattern were taken. The calibration result is shown in the third row of the FIG. 7. The fourth row displays the relative difference between the plane-based result and the nonlinear solution with respect to the focal length (828.92). There is about a two percent difference between the calibration techniques, which can be attributed to noise, imprecision of the extracted data points and a rudimentary experimental setup. Nevertheless, despite these non-ideal factors, the calibration results using a one-dimensional object are very encouraging.

Exemplary Computing System and Environment

Figure 8:
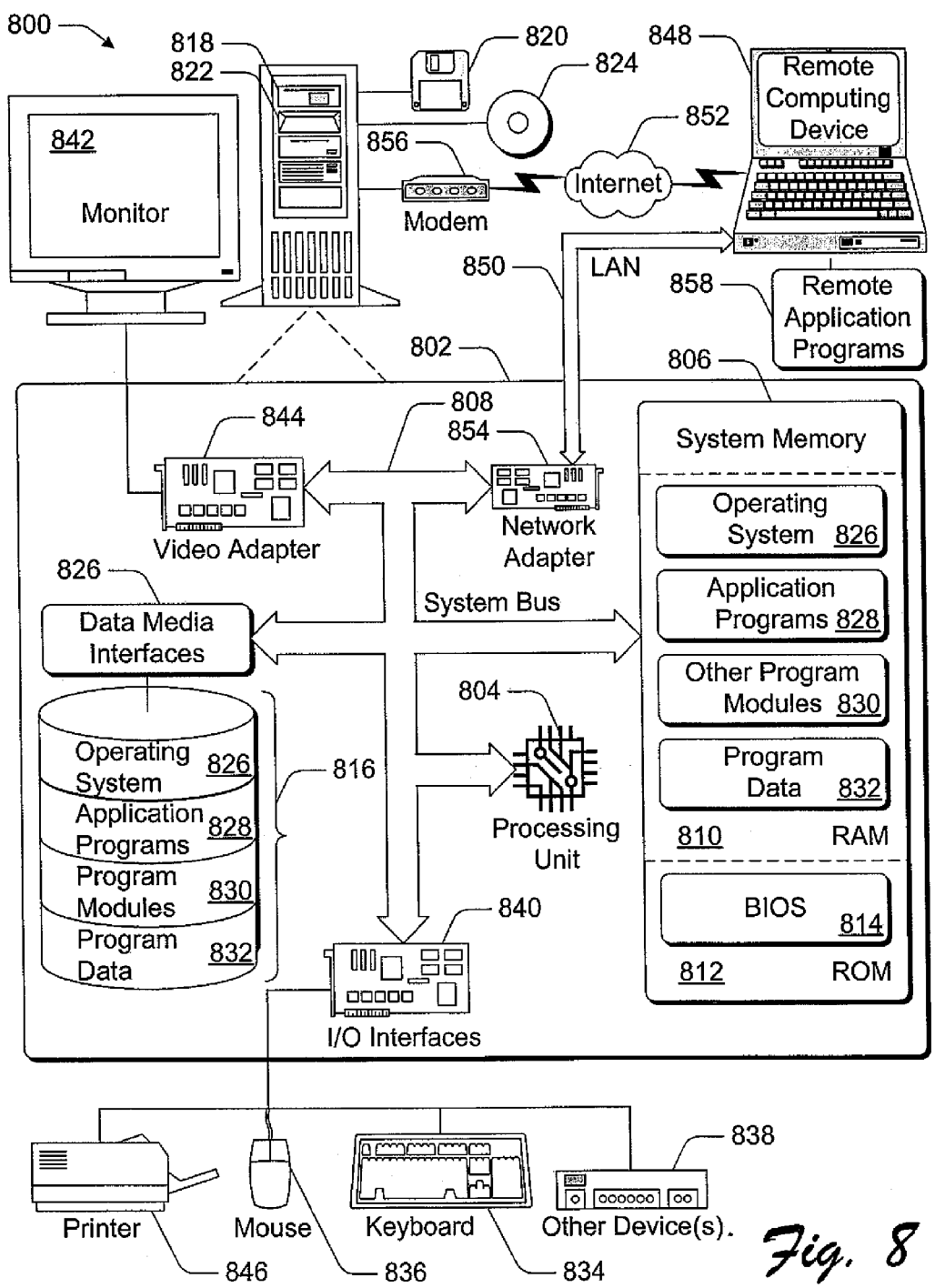
FIG. 8 illustrates an example of a computing environment within which the computer, network, and system architectures described herein can be either fully or partially implemented.

FIG. 8 illustrates an example of a computing environment 800 within which the computer, network, and system architectures (such as camera calibration system 100) described herein can be either fully or partially implemented. Exemplary computing environment 800 is only one example of a computing system and is not intended to suggest any limitation as to the scope of use or functionality of the network architectures. Neither should the computing environment 800 be interpreted as having any dependency or requirement relating to any one or combination of components illustrated in the exemplary computing environment 800.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices and the like.

The camera calibration methodologies may be described in the general context of computer-executable instructions, such as program modules, being executed by a computer. Generally, program modules include routines, programs, objects, components, data structures, etc. that perform particular tasks or implement particular abstract data types. The camera calibration methodologies may also be practiced in distributed computing environments where tasks are performed by remote processing devices that are linked through a communications network. In a distributed computing environment, program modules may be located in both local and remote computer storage media including memory storage devices.

The computing environment 800 includes a general-purpose computing system in the form of a computer 802. The components of computer 802 can include, by are not limited to, one or more processors or processing units 804, a system memory 806, and a system bus 808 that couples various system components including the processor 804 to the system memory 806.

The system bus 808 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 802 typically includes a variety of computer readable media. Such media can be any available media that is accessible by computer 802 and includes both volatile and non-volatile media, removable and non-removable media. The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 typically contains data and/or program modules that are immediately accessible to and/or presently operated on by the processing unit 804.

Computer 802 can also include other removable/non-removable, volatile/non-volatile computer storage media. By way of example, FIG. 8 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 826. Alternatively, the hard disk drive 816, magnetic disk drive 818, and optical disk drive 822 can be connected to the system bus 808 by a SCSI interface (not shown).

The disk drives and their associated computer-readable media provide non-volatile storage of computer readable instructions, data structures, program is modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 826, one or more application programs 828, other program modules 830, and program data 832. Each of such operating system 826, one or more application programs 828, other program modules 830, and program data 832 (or some combination thereof) may include an embodiment of the camera calibration methodologies.

Computer system 802 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device can also be connected to the system bus 808 via an interface, such as a video adapter 844. In addition to the monitor 842, other output peripheral devices can include components such as speakers (not shown) and a printer 846 which can be connected to computer 802 via the input/output interfaces 840.

Computer 802 can operate in a networked environment using logical connections to one or more remote computers, such as a remote computing device 848. By way of example, the remote computing device 848 can be a personal computer, portable computer, a server, a router, a network computer, a peer device or other common network node, and the like. The remote computing device 848 is illustrated as a portable computer that can include many or all of the elements and features described herein relative to computer system 802.

Logical connections between computer 802 and the remote computer 848 are depicted as a local area network (LAN) 850 and a general wide area network (WAN) 852. Such networking environments are commonplace in offices, enterprise-wide computer networks, intranets, and the Internet. When implemented in a LAN networking environment, the computer 802 is connected to a local network 950 via a network interface or adapter 854. When implemented in a WAN networking environment, the computer 802 typically includes a modem 856 or other means for establishing communications over the wide network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs 858 reside on a memory device of remote computer 848. For purposes of illustration, application programs and other executable program components, such as the operating system, are illustrated herein as discrete blocks, although it is recognized that such programs and components reside at various times in different storage components of the computer system 802, and are executed by the data processor(s) of the computer.

References

[1] Duane C. Brown. Close-range camera calibration. *Photogrammetric Engineering*, 37(8):855-866, 1971.

[2] Bruno Caprile and Vincent Torre. Using Vanishing Points for Camera Calibration. *The International Journal of Computer Vision*, 4(2):127-140, March 1990.

[3] W. Faig. Calibration of close-range photogrammetry systems: Mathematical formulation. *Photogrammetric Engineering and Remote Sensing*, 41(12):1479-1486, 1975.

[4] Oliver Faugeras. *Three-Dimensional Computer Vision: a Geometric Viewpoint*. MIT Press, 1993.

[5] Oliver Faugeras, Tuan Luong, and Steven Maybank. Camera self-calibration: theory and experiments. In G. Sandini, editor, *Proc 2nd ECCV*, volume 588 of *Lecture Notes in Computer Science*, pages 321-334, Santa Margherita Ligure, Italy, May 1992. Springer-Verlag.

[6] Oliver Faugeras and Giorgio Toscani. The calibration problem for stereo. In *Proceedings of the IEEE Conference on Computer Vision and Pattern Recognition*, pages 15-20, Miami Beach, Fla., June 1986. IEEE.

[7] S. Ganapathy. Decomposition of transformation matrices for robot vision. *Pattern Recognition Letters*, 2:401-412, December 1984.

[8] D. Gennery. Stereo-camera calibration. In *Proceedings of the 10th Image Understanding Workshop*, pages 101-108, 1979.

[9] Richard Hartley. Self-calibration from multiple views with a rotating camera. In J- O. Eklundh, editor, *Proceedings of the 3rd European Conference on Computer Vision*, volume 800-801 of *Lecture Notes in Computer Science*, pages 471-478, Stockholm, Sweden, May 1994. Springer-Verlag.

[10] Richard I. Hartley. An algorithm for self calibration from several views. In *Proceedings of the IEEE Conference on Computer Vision and Pattern Recognition*, pages 808-912, Seattle, Wash., June 1994. IEEE.

[11] D. Liebowitz and A. Zisserman. Metric rectification for perspective images of planes. In *Proceedings of the IEEE Conference on Computer Vision and Pattern Recognition*, pages 482-488, Santa Barbara, Calif., June 1998. IEEE Computer Society.

[12] Q. -T. Luong and O. D. Faugeras. Self-calibration of a moving camera from point correspondences and fundamental matrices. *The International Journal of Computer Vision*, 22(3):261-289, 1997.

[13] Quang-Tuan Luong. *Matrice Fondamentale et Calibration Visuelle sur l'Environment-Vers une plus grande autonomie des systèmes robotiques*, PhD thesis, Université de Paris-Sud, Center d'Orsay, December 1992.

[14] S. J. Maybank and O. D. Faugeras. A theory of self-calibration of a moving Camera. *The International Journal of Computer Vision*, 8(2):123-152, August 1992.

[15] J. J. More. The levenberg-marquardt algorithm, implementation and theory. In G. A. Watson, editor, *Numerical Analysis*, Lecture Notes in Mathematics 630. Springer-Verlag, 1977.

[16] G. Stein. Accurate internal camera calibration using rotation, with analysis of sources of error. In *Proc. Fifth International Conference on Computer Vision*, pages 230-236, Cambridge, Mass., June 1995.

[17] P. Sturm and S. Maybank. On plane-based camera calibration: A general algorithm, singularities, applications. In *Proceedings of the IEEE Conference on Computer Vision and Pattern Recognition*, pages 432-437, Fort Collins, Colo., June 1999. IEEE Computer Society Press.

[18] B. Triggs. Autocalibration from planar scenes. In *Proceedings of the 5th European Conference on Computer Vision*, pages 89-105, Freiburg, Germany, June 1998.

[19] Roger Y. Tsai. A versatile camera calibration technique for high-accuracy 3D machine vision metrology using off-the-shelf tv cameras and lenses. *IEEE Journal of Robotics and Automation*, 3(4):323-344, August 1987.

[20] G. Q. Wei and S. D. Ma. A complete two-plane camera calibration method and experimental comparisons. In *Proc. Fourth International Conference on Computer Vision*, pages 439-446, Berlin, May 1993.

[21] J. Weng, P. Cohen, and M. Herniou. Camera calibration with distortion models and accuracy evaluation. *IEEE*

Transactions on Pattern Analysis and Machine Intelligence, 14(10):965-980, October 1992.

[22] Z. Zhang. A flexible new technique for camera calibration. *IEEE Transactions on Pattern Analysis and Machine Intelligence,* 22(11):1330-1334, 2000.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. In a computer system, a method comprising:
    receiving images of a calibration object whose geometry is one-dimension in space, the received images showing the calibration object in six or more distinct configurations, wherein:
        the calibration object comprises three or more collinear points with known relative positions between the points; and
        at least one of the collinear points remains fixed with respect to the other points in the received images showing the calibration object in several distinct position; and
    calculating a calibration for a camera based on the received images of the calibration object.

2. One or more computer-readable media comprising computer-executable instructions that, when executed, perform the method as recited in claim 1.

3. A method, comprising:
    imaging a one-dimensional object in six or more distinct configurations, the imaging performed by an object imaging device, wherein the one-dimensional object comprises three or more collinear points with known relative positions between the points and wherein at least one of the collinear points remains fixed with respect to the other points in the received images showing the calibration object in several distinct positions; and
    estimating unknown parameters associated with object imaging device by computing parameters associated with imaging the one-dimensional object in the six or more distinct configurations.

4. The method as recited in claim 3, further comprising calculating unknown parameters associated with the object imaging device and the one-dimensional object using a closed-form equation.

5. The method as recited in claim 3, further comprising calculating unknown parameters associated with the object imaging device and the one-dimensional object using a non-linear solution.

6. One or more computer-readable media comprising computer-executable instructions that, when executed, perform the method as recited in claim 3.

7. A system, comprising:
    means for imaging a one-dimensional object in six or more distinct configurations; and
    means for estimating unknown parameters associated with object imaging device by computing parameters associated with imaging the one-dimensional object in the six or more distinct configurations, wherein the one-dimensional object comprises three or more collinear points with known relative positions between the points and wherein at least one of the collinear points is fixed.

8. The system as recited in claim 7, wherein the means for imaging the one-dimensional object is an object imaging device.

9. The system as recited in claim 7, further comprising means for calculating unknown parameters associated with the object imaging device and the one-dimensional object using a closed-form equation.

10. The method as recited in claim 7, further comprising calculating unknown parameters associated with the object imaging device and the one-dimensional object using a non-linear solution.

\* \* \* \* \*